(12) United States Patent
Sakaguchi et al.

(10) Patent No.: US 8,091,679 B2
(45) Date of Patent: Jan. 10, 2012

(54) ELECTRIC POWER STEERING DEVICE

(75) Inventors: Toru Sakaguchi, Maebashi (JP); Mitsuhiro Fukuda, Maebashi (JP); Yasuhide Nomura, Maebashi (JP)

(73) Assignee: NSK Ltd., Tokyo (JP)

( * ) Notice: Subject to any disclaimer, the term of this patent is extended or adjusted under 35 U.S.C. 154(b) by 1158 days.

(21) Appl. No.: 11/587,776

(22) PCT Filed: Apr. 20, 2005

(86) PCT No.: PCT/JP2005/007943
§ 371 (c)(1), (2), (4) Date: Jul. 12, 2007

(87) PCT Pub. No.: WO2005/105548
PCT Pub. Date: Nov. 10, 2005

(65) Prior Publication Data
US 2007/0278032 A1  Dec. 6, 2007

(30) Foreign Application Priority Data
Apr. 28, 2004 (JP) ................ 2004-133421

(51) Int. Cl.
 *B62D 5/04* (2006.01)

(52) U.S. Cl. .............. 180/446; 701/36; 701/41; 701/43; 180/443; 180/444; 318/432; 318/434

(58) Field of Classification Search .................. 180/446, 180/443, 444; 701/36, 41, 43; 318/432, 318/434
See application file for complete search history.

(56) References Cited

U.S. PATENT DOCUMENTS

| | | | | |
|---|---|---|---|---|
| 5,826,677 A * | 10/1998 | Nishizaki et al. | ............. | 180/421 |
| 5,889,376 A * | 3/1999 | Takatsuka et al. | ............. | 318/434 |
| 5,912,539 A * | 6/1999 | Sugitani et al. | ............... | 318/434 |
| 6,373,217 B1* | 4/2002 | Kawada et al. | ............... | 318/564 |
| 6,381,528 B1* | 4/2002 | Kawada et al. | ................. | 701/41 |
| 6,496,762 B2* | 12/2002 | Kurishige et al. | ............... | 701/41 |
| 6,520,279 B2* | 2/2003 | Fukumoto et al. | ........... | 180/446 |
| 6,543,572 B2* | 4/2003 | Mukai et al. | .................. | 180/446 |
| 6,644,433 B2* | 11/2003 | Sato | ............................. | 180/446 |

(Continued)

FOREIGN PATENT DOCUMENTS

EP   1 336 547 A1   8/2003

(Continued)

OTHER PUBLICATIONS

Supplementary European Search Report dated Aug. 14, 2007 and Supplementary Partial European Search Report dated Jun. 22 2007, for counterpart European Application No. EP 05 73 4601.

*Primary Examiner* — Thomas G. Black
*Assistant Examiner* — Wae Louie
(74) *Attorney, Agent, or Firm* — Sidley Austin LLP

(57) ABSTRACT

A highly safe electric power steering device including a control device for determining the failure of a motor current detector based on the difference between the motor current estimate value and the detected motor current value is provided. The abnormality determining unit computes the absolute value of difference between the motor current estimate value and the detected motor current value, measures the number of times when the absolute value of difference exceeded the predetermined threshold value within the predetermined period, and measures further the cumulative value of the number of times of exceeding the threshold value within the predetermined period. When the cumulative value exceeded the predetermined reference number of times for determining abnormality, the motor current detector is determined to be abnormal.

2 Claims, 5 Drawing Sheets

U.S. PATENT DOCUMENTS

| | | | |
|---|---|---|---|
| 6,691,818 B2 * | 2/2004 | Endo et al. | 180/446 |
| 6,744,232 B2 * | 6/2004 | Endo | 318/432 |
| 6,808,043 B2 * | 10/2004 | Kawada et al. | 180/446 |
| 6,854,559 B2 * | 2/2005 | Kurishige et al. | 180/446 |
| 6,856,869 B2 * | 2/2005 | Takahashi | 701/41 |
| 6,863,150 B1 * | 3/2005 | Tanaka et al. | 180/446 |
| 6,943,512 B2 * | 9/2005 | Kobayashi | 318/432 |
| 7,199,549 B2 * | 4/2007 | Kleinau et al. | 318/798 |
| 7,203,582 B2 * | 4/2007 | Yokota | 701/41 |
| 7,242,161 B2 * | 7/2007 | Okamoto et al. | 318/432 |
| 7,260,458 B2 * | 8/2007 | Kato et al. | 701/41 |
| 7,302,328 B2 * | 11/2007 | Kato et al. | 701/41 |
| 7,380,634 B2 * | 6/2008 | Fujita | 180/444 |
| 7,406,375 B2 * | 7/2008 | Fujita et al. | 701/41 |
| 7,500,538 B2 * | 3/2009 | Hara et al. | 180/412 |
| 7,604,088 B2 * | 10/2009 | Nishizaki et al. | 180/446 |
| 7,619,859 B2 * | 11/2009 | Zeniya et al. | 361/25 |
| 7,631,722 B2 * | 12/2009 | Miyajima et al. | 180/442 |
| 7,663,273 B2 * | 2/2010 | Shiino et al. | 310/59 |
| 7,694,777 B2 * | 4/2010 | Yamashita et al. | 180/443 |
| 7,860,624 B2 * | 12/2010 | Kubota et al. | 701/41 |
| 2007/0278032 A1 * | 12/2007 | Sakaguchi et al. | 180/446 |

FOREIGN PATENT DOCUMENTS

| | | |
|---|---|---|
| JP | 63-180567 A | 7/1988 |
| JP | 9-39809 A | 2/1997 |
| JP | 11-29055 A | 2/1999 |
| JP | 2000-318633 A | 11/2000 |
| JP | 2002-234457 A | 8/2002 |
| JP | 2002-347635 A | 12/2002 |
| JP | 2002-359919 A | 12/2002 |
| JP | 2003-237597 A | 8/2003 |
| JP | 2003-237609 A | 8/2003 |
| WO | WO 2005/105548 A1 | 11/2005 |

* cited by examiner (a)

(b)

ELECTRIC POWER STEERING DEVICE

RELATED APPLICATIONS

This application is a National Stage of International Application No. PCT/JP2005/007943, filed Apr. 20, 2005, which is based on Japanese Patent Application No. 2004-133421 filed with Japanese Patent Office on Apr. 28, 2004, the entire content of which is incorporated herein by reference.

TECHNICAL FIELD

The present invention relates to an electric power steering device, especially the control device of an electric power steering device capable of correctly detecting any failure of the motor current detection circuit.

BACKGROUND ART

The electric power steering device for vehicle detects the steering torque generated on the steering shaft by the operation of a steering wheel and the speed of vehicle, computes the motor current reference value based on the signal detected thereby, drives the motor with current corresponding to the motor current reference value computed thereby to assist the steering power of the steering wheel. Such an electric power steering device is controlled by an electronic control circuit, and the control is summarized as follows.

Specifically, when the steering wheel is steered and a steering torque is generated, the electronic control circuit can give the optimum steering assist force corresponding to the running condition by computing the motor current reference value as constituting the target value of the motor output in response to the steering torque and the vehicle speed so that a large steering assist force may be supplied when the detected vehicle speed is zero or low and a small steering assist force may be supplied when the detected vehicle speed is high, and by proceeding to a current feedback control so that the difference between the motor current reference value resulting from the computation and the detected motor current value may be reduced to zero.

The above-mentioned control circuit of the electric power steering device computes the motor current reference value by taking the steering torque and the vehicle speed as parameters and does not take into account the rotation speed of the motor. The rotation of the motor leads to the generation of back electromotive force. However, if the impact of back electromotive force resulting from the rotation of the motor is not taken into account in the process of a current feedback control, the difference between the motor current reference value and the detected motor current value grows large resulting in an erroneous determination that an abnormal current is flowing in the motor.

As a countermeasure against this phenomenon, the applicant of the present invention proposed a method of determining whether the difference between the motor current estimate value computed by applying a mathematical model on the motor current reference value and the detected motor current value that has been detected exceeds the predetermined allowed value, and determining that the driving system has failed when the difference exceeds the allowed value (refer to Japanese Laid Open Patent Publication JP2002-234457).

And when the detected value of the steering torque has turned out to be an abnormal value, for example, when the motor wiring is connected in the reverse direction to the normal state, the direction of the steering assist force that should be primarily given by the motor is not coincided with the direction of the steering assist force actually given by the motor. As a result, the detected value of the steering torque turns out to be an abnormal value, and the detected motor current value also turns out to be an abnormal value. Consequently, a fail-safe control is activated and the steering assistance is terminated.

As a countermeasure against this phenomenon, it is proposed a method of determining that the detected value of the steering torque is an abnormal value when the detected value of the steering torque exceeds the predetermined value or the change ratio of the steering torque exceeds the predetermined value, or that the detected motor current value is an abnormal value when the motor current exceeds the predetermined value or the change ratio of the motor current exceeds the predetermined value and taking the predetermined measures required in the case of detecting an abnormality (refer to Japanese Laid Open Patent Publication JP2003-237609).

According to the former method of determining the failure of the driving system described above, when the motor current detecting circuit for detecting the motor current has failed, as the reversal of the motor current direction repeatedly occurs and the time during which the difference between the motor current estimate value and the detected motor current value exceeds the allowed value is short, it is difficult to determine any abnormality, and therefore another detection means is necessary for detecting whether the motor current detection circuit is normal or abnormal.

And according to the latter method of determining failure, it is difficult to set the predetermined reference value (threshold value) for determining the abnormality of motor current or change rate in motor current, and depending on the setting of the predetermined reference value, a determination of normal condition or that of failure may be given.

The object of the present invention is to provide an electric power steering device capable of solving the problem described above and detecting correctly the failure of the current detection circuit.

DISCLOSURE OF THE INVENTION

The first invention relates to an electric power steering device having a controlling device for controlling the motor output that gives steering assist force to the steering system based on the steering torque generated at least on the steering shaft wherein the controlling device described above includes a current reference value calculator for computing the current reference value or the control target value of the motor output based on the steering torque detected at every predetermined sampling interval, a motor current estimator for computing the motor current estimate value based on the current reference value, a motor current detector for detecting the motor current, and an abnormality monitor for monitoring the abnormality of the motor current detector and for outputting a signal for terminating the motor drive when an abnormal condition is detected, and the abnormality monitor measures the number of times when the difference between the motor current estimate value computed as described above and the detected motor current value that has been detected exceeded the predetermined threshold value within the predetermined period and determines that the motor current detector is abnormal when the number of excesses exceeded the predetermined reference number for determining abnormality.

The second invention relates to an electric power steering device having a controlling device for controlling the motor output that gives steering assist force to the steering system based on the steering torque generated at least on the steering shaft wherein the controlling device described above includes a current reference value calculator for computing the current reference value or the control target value of the motor output based on the steering torque detected at every predetermined sampling interval, a motor current estimator for computing the motor current estimate value based on the current reference value, a motor current detector for detecting the motor current, and an abnormality monitor for monitoring the abnormality of the motor current detector and for outputting a signal for terminating the motor drive when an abnormal condition is detected, and the abnormality monitor measures the number of times when the difference between the motor current estimate value computed as described above and the detected motor current value that has been detected exceeded the predetermined threshold value within the first predetermined period that had been set in advance, measures the cumulative value of the number of times of exceeding the threshold value within the second predetermined period and determines that the motor current detector is abnormal when the cumulative value exceeded the predetermined reference number for determining abnormality.

The third invention relates to an electric power steering device having a controlling device for controlling the motor output that gives steering assist force to the steering system based on the steering torque generated at least on the steering shaft wherein the controlling device described above includes a current reference value calculator for computing the current reference value or the control target value of the motor output based on the steering torque detected at every predetermined sampling interval, a motor current estimator for computing the motor current estimate value based on the current reference value, a motor current detector for detecting the motor current, and an abnormality monitor for monitoring the abnormality of the motor current detector and for outputting a signal for terminating the motor drive when an abnormal condition is detected, and the abnormality monitor measures the number of times when the motor current estimate value computed as described above and the detected motor current value that has been detected respectively exceeded the predetermined threshold value within the predetermined period, and determines that the motor current detector is abnormal when the difference of the number of excesses exceeded the predetermined reference number for determining abnormality.

The fourth invention relates to an electric power steering device having a controlling device for controlling the motor output that gives steering assist force to the steering system based on the steering torque generated at least on the steering shaft wherein the controlling device described above includes a current reference value calculator for computing the current reference value or the control target value of the motor output based on the steering torque detected at every predetermined sampling interval, a motor current estimator for computing the motor current estimate value based on the current reference value, a motor current detector for detecting the motor current, and an abnormality monitor for monitoring the abnormality of the motor current detector and for outputting a signal for terminating the motor drive when an abnormal condition is detected, and the abnormality monitor measures the derivative value of the estimated motor current value computed as described above and the derivative value of the detected motor current value that has been detected exceeded respectively the predetermined threshold value within the predetermined period, and determines that the motor current detector is abnormal when the difference in the number of times of exceeding exceeded the predetermined reference number of times for determining abnormality.

The fifth invention relates to an electric power steering device having a controlling device for controlling the motor output that gives steering assist force to the steering system based on the steering torque generated at least on the steering shaft wherein the controlling device described above includes a current reference value calculator for computing the current reference value or the control target value of the motor output based on the steering torque detected at every predetermined sampling interval, a motor current estimator for computing the motor current estimate value based on the current reference value, a motor current detector for detecting the motor current, and an abnormality monitor for monitoring the abnormality of the motor current detector and for outputting a signal for terminating the motor drive when an abnormal condition is detected, and the abnormality monitor measures the first number of times when the derivative value of the detected motor current value that has been detected was less than the predetermined threshold value set in advance within the predetermined period, and when the first number of times exceeded the predetermined number of times, measures the second number of times when the derivative value of the estimated motor current value that has been computed exceeded the predetermined threshold value within the predetermined period and determines that the motor current detector is abnormal when the second number of times exceeded the predetermined number of times.

The sixth invention relates to an electric power steering device having a controlling device for controlling the motor output that gives steering assist force to the steering system based on the steering torque generated at least on the steering shaft wherein the controlling device described above includes a current reference value calculator for computing the current reference value or the control target value of the motor output based on the steering torque detected at every predetermined sampling interval, a motor current estimator for computing the motor current estimate value based on the current reference value, a motor current detector for detecting the motor current, and an abnormality monitor for monitoring the abnormality of the motor current detector and for outputting a signal for terminating the motor drive when an abnormal condition is detected, and the abnormality monitor measures the first number of times when the derivative value of the estimated motor current value that has been computed was less than the predetermined threshold value within the predetermined period, and when the first number of times exceeded the predetermined number of times, measures the second number of times when the derivative value of the detected motor current value that had been detected exceeded the predetermined threshold value within the predetermined period, and when the second number of times exceeded the predetermined number of times, determines that the motor current detector is abnormal.

And in the case where the abnormality monitor described above determined that the motor current detector was abnormal, it is preferable to adopt a structure wherein the electric power steering device according to the first invention to the sixth invention can shut off the signal for driving the motor or the motor power circuit.

As described above, the electric power steering device according to the present invention detects an abnormality of the motor current detector based on the number of times when the difference between the estimated motor current value computed from the current reference value or its derivative value and the detected motor current value detected by the motor current detector or its derivative value exceeded the predetermined threshold value within the predetermined period set in advance. And in this way, it is possible to provide a highly safe electric power steering device capable of correctly detecting any failure of the motor current detector.

DESCRIPTION OF THE PREFERRED EMBODIMENT

Figure 1:
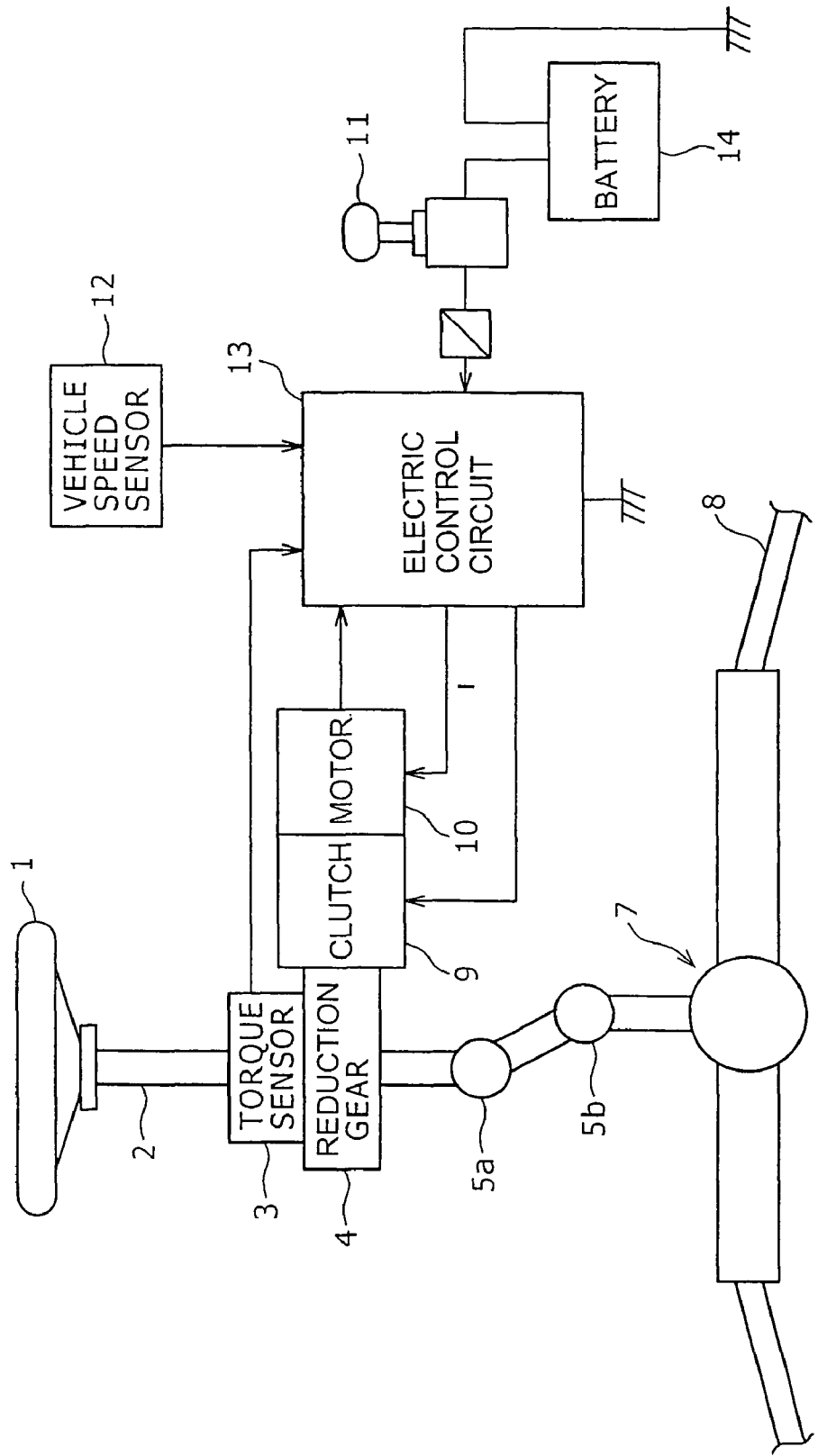
FIG. 1 is an illustration describing the schematic configuration of an electric power steering device according to an embodiment of the present invention.

A preferred embodiment of the present invention will be described here. FIG. 1 is an illustration describing the schematic configuration of an electric power steering device. The shaft 2 of the steering wheel 1 is connected with a tie rod 8 through the reduction gear 4, universal joints 5a, 5b, and a rack and pinion system 7. The shaft 2 is provided with a torque sensor 3 for detecting the steering torque of the steering wheel 1, and the motor 10 for assisting the steering force is connected with the shaft 2 through a clutch 9 and a reduction gear 4.

The electronic control circuit 13 for controlling the power steering device is fed with power by the battery 14 through the ignition key 11. The electronic control circuit 13 computes the motor current reference value [Ir] based on the steering torque detected by the torque sensor 3 and the vehicle speed detected by the vehicle speed sensor 12 and controls the current control value E to be supplied to the motor based on the motor current reference value (hereinafter referred to as "the current reference value") [Ir] computed.

The clutch 9 is controlled by the electronic control circuit 13. The clutch 9 is in contact during the normal operating condition and it is put out of contact when the electronic control circuit 13 determines that the power steering device is failure and when the power is turned "OFF."

Figure 2:
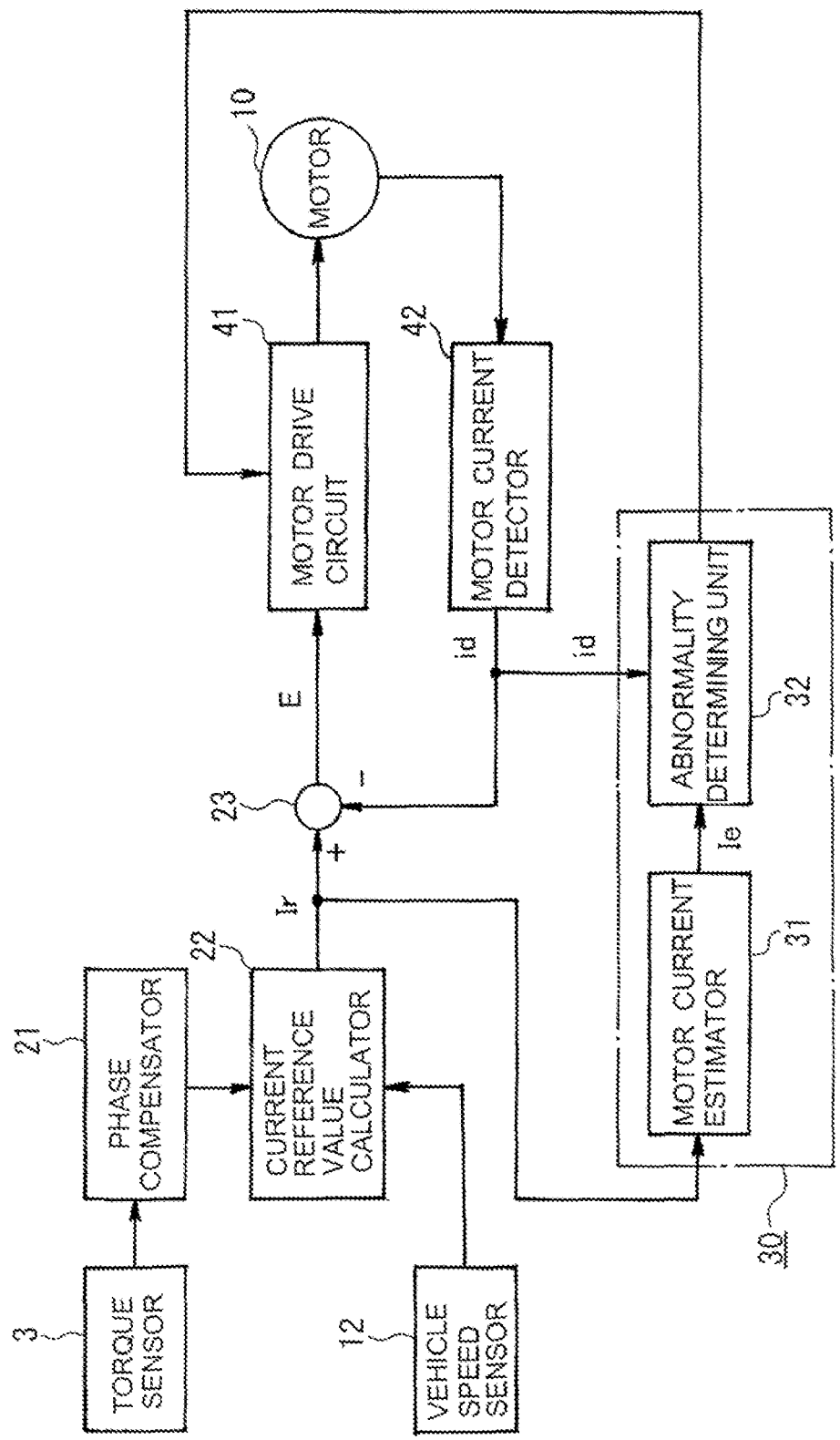
FIG. 2 is a block diagram showing the configuration of an electronic control circuit.

FIG. 2 is a block diagram showing the configuration of an electronic control circuit 13. A CPU constitutes the electronic control circuit 13, and this block diagram shows the control functions executed by the program within the CPU. For example, the phase compensator 21 does not show an independent phase compensator but shows the phase compensation function executed by the CPU. Incidentally, it is needless to say that, instead of constituting the electronic control circuit 13 by a CPU, these functional elements can be constituted respectively by independent hardware.

The functions and operation of the electronic control circuit 13 is described. The steering torque detected by the torque sensor 3 is phase compensated by the phase compensator 21 in order to improve the stability of the steering system, and the result is inputted into the current reference value calculator 22. The vehicle speed signals detected by the vehicle speed sensor 12 are also inputted into the current reference value calculator 22.

Based on the steering torque, vehicle speed and other parameters inputted, the current reference value calculator 22 computes the current reference value [Ir] or the target control value of the current to be fed on the motor 10 by the predetermined computation formula.

The adder 23 is an adder for adding the current reference value [Ir] and the detected motor current value [id] acquired by detecting the current that actually flows in the motor 10 including the positive and negative sign, and adds the detected motor current value [id] to the current reference value [Ir] for obtaining the current control value E. The current control value E is outputted to the motor driving circuit 41, and drives the motor 10 or the controlled object. The detected motor current value [id] actually flowing in the motor 10 is detected by the motor current detector 42, is fed back to the adder 23 described above for a feed-back control.

The abnormality monitor 30 includes a motor current estimator 31 for computing for estimating the motor current based on the current reference value [Ir] and an abnormality determining unit 32, and the abnormality determining unit 32 determines the abnormality of the motor current detector 42 based on the motor current estimate value [Ie] outputted by the motor current estimator 31 and the detected motor current value [id] detected by the motor current detector 42. There are a plurality of examples for the constitution of the abnormality monitor 30, and it will be described in later.

Figure 3:
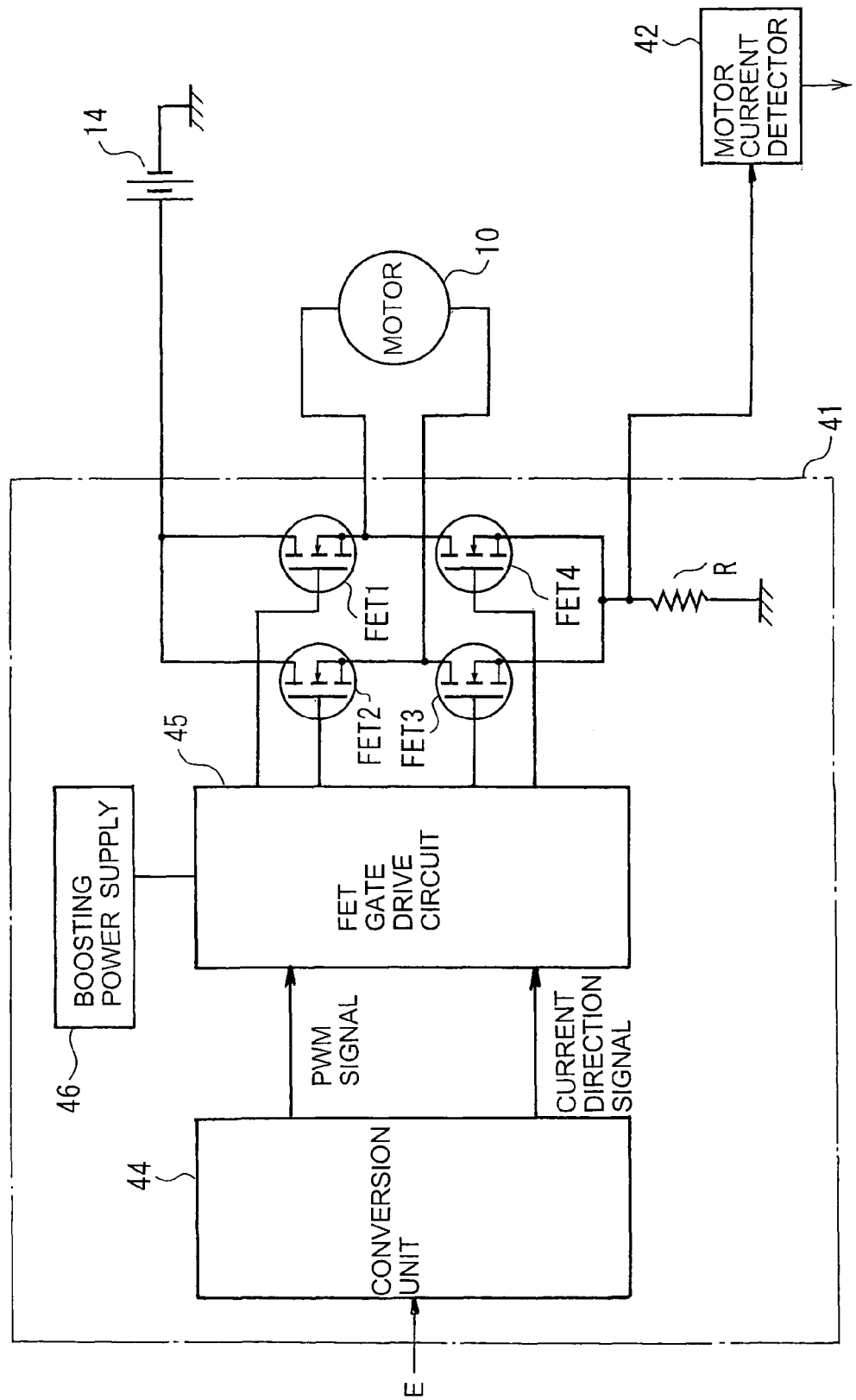
FIG. 3 is a block diagram showing an example of the configuration of a motor drive circuit.

FIG. 3 is a block diagram showing an example of the configuration of the motor drive circuit 41. The motor drive circuit 41 includes a conversion unit 44 for separating and converting the current control value E inputted by the adder 23 (refer to FIG. 2) into the PWM signal (pulse width modulation signal) and the current direction signal, FET 1-FET 4, a FET gate drive circuit 45 for opening, closing and driving the gates and the like. Incidentally, the boosting power supply 46 is the power supply for driving the high side of FET 1 and FET 2.

The PWM signal is a signal for driving the gates of FET (field effect transistor) switching elements FET 1-FET 2 connected in the form of H bridge, and duty ratio (time ratio of turning ON/OFF the gate of FET) of the PWM signal. The PWM signal is determined based on the absolute value of the current control value E computed by the adder 23. The current direction signal is a signal for indicating the direction of current to be fed on the motor, and it is a signal determined by the sign (positive or negative) of the current control value E computed by the adder 23.

FET 1 and FET 2 are switching elements turning ON/OFF the gate based on the duty ratio D of the PWM signal described above, and are switching elements for controlling the magnitude of current flow in the motor. FET 3 and FET 4 are switching elements turning ON or OFF the gate (when a gate is turned ON, the other is turned OFF) based on the current direction signal described above, and are switching elements for switching the direction of current flow in the motor, or the direction of the motor rotation. When the FET 3 is "ON", current flows through the FET 1, motor 10, FET 3 and resistance R and current in the positive direction flows in the motor 10. And when FET 4 is "ON", current flows through the FET 2, motor 10, FET 4, and resistance R and current in the negative direction flows in the motor 10.

The motor current detector 42 detects the current flow based on the voltage descent on both ends of the resistance R. The detected motor current value [id] is inputted to the adder 23 (refer to FIG. 2).

When steering torque is generated as a result of handling of the steering wheel and the detected steering torque is large, or the detected vehicle speed is zero or low, the electronic control circuit described above sets the current reference value [Ir] at a high value, and when the detected steering torque is small or the detected vehicle speed is high, the electronic control circuit sets the current control value [Ir] at a low value.

Therefore, the system can give the optimum steering assist force corresponding to the driving condition.

The abnormality monitor 30 determines the abnormality of the motor current detector 42 from the number of times when the absolute value of difference |Ie−id| between the motor current estimate [Ie] (or its derivative value) computed or estimated based on the current reference value [Ir] inputted as the input signal and computed based on the steering torque T sampled at the predetermined cycle and the detected motor current [id] (or its derivative value) detected by the motor current detector 42 at the predetermined cycle exceeded the predetermined threshold value within the predetermined period.

When an abnormality is determined, the output of current control value E to the motor drive circuit 41 is shut off to stop the motor, or a relay not shown and provided in the circuit for feeding the motor drive circuit 41 with power from the battery is activated to shut off the supply of power to the motor and to stop the steering assistance by the motor. In this state, the steering assistance by motor is terminated. However, it is possible to steer manually. There is a plurality of examples for the constitution of the abnormality monitor 30, and it will be described later.

The computation of motor current estimate value [Ie] by the motor current estimator 31 will be described. The computation of the motor current estimate value [Ie] is described in Japanese Laid Open Patent Publication JP2002-234457 described above, and the present invention adopts the method described there. It will be described briefly the main points thereof.

Figure 4:
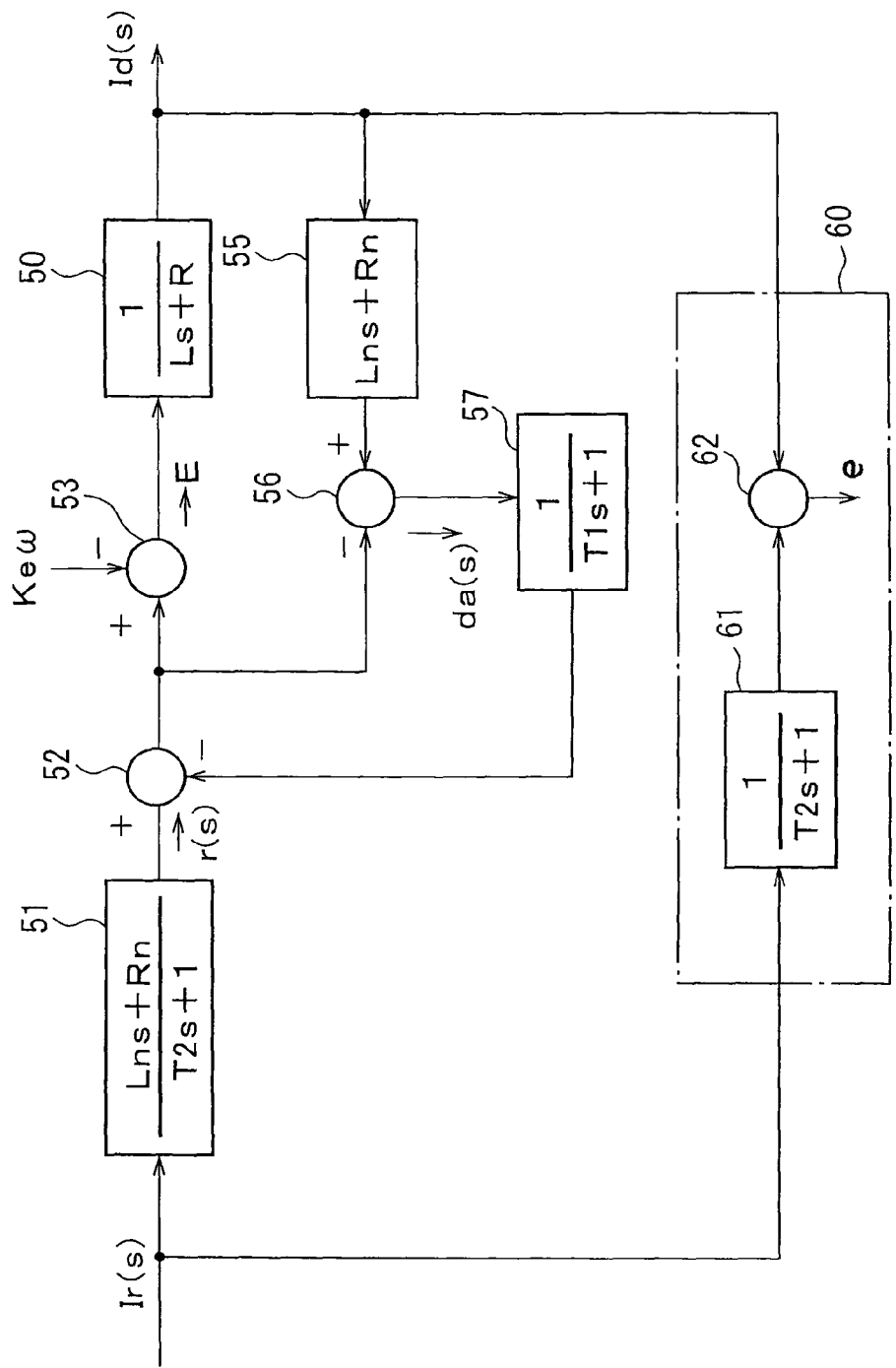
FIG. 4 is a block diagram showing the control system by transfer functions.

FIG. 4 is a block diagram showing the above-mentioned electric control circuit by transfer functions. The reference number 50 represents the motor to be controlled, and when the inductance of the motor is represented by L, the internal resistance of the motor is shown by R and the Laplace operator is represented by s, the motor elements are represented by 1/(Ls+R).

Reference number 51 represents a feed forward compensator for defining the response characteristic of the detected motor current value [Id](s) for the current reference value [Ir](s). Here, Ln represents the design value of the motor inductance, Rn represents the design value of the internal resistance of the motor, T2 represents the time constant and s represents the Laplace operator.

Reference number 52 represents an adder for adding the output r(s) of the feed forward compensator 51 and the output of the filter 57 described below, and the output da(s) of the adder 56 described below is fed back to the adder 52 through the filter 57 to be added to the output r(s) of the feed forward compensator. This process enables to compensate the variation of the controlled object 50 and the fluctuation of the back electromotive force resulting from the rotation of the motor.

Reference number 53 represents an element of addition and shows that the back electromotive force Keω resulting from the rotation of the motor on the input side of the controlled object is added to the output of the adder 52 and appears on the detected motor current value Id(s), and shows equivalently the impact of the back electromotive force Keω appearing in the detected motor current value Id(s). Here, Ke represents the back electromotive force constant of the motor, and ω represents the angular speed of the motor. The output of the adder 53 is the current control value E defining the current to be fed on the motor.

Reference number 55 represents the circuit element showing the inverse characteristic of the motor characteristic, and in this embodiment it is designed by using a mathematical model of electric characteristics excluding the member of equation of back electromotive force, Ln, Rn representing respectively the design value of the inductance of the motor and the design value of the internal resistance of the motor, and s representing Laplace operator.

Reference number 56 represents the adder and computes the difference between the output of the circuit element 55 and the output of the adder 52, or the difference between the desired motor control characteristic according to the controller output standard and the actual control characteristic. The output da(s) of the adder 56 is shown by the following equation (1):

$$da(s) = (Lns + Rn) \cdot Id(s) - \left(\frac{Ls + R}{K} Id(s) + Ke\omega\right) \quad (1)$$
$$= \left(\left(Ln - \frac{L}{K}\right)s + \left(Rn - \frac{R}{K}\right)\right) \cdot Id(s) - Ke\omega$$

The equation (1) shows that the output [da](s) of the adder 56 is the sum total of the variation of the controlled object and the back electromotive force. Provided that L and R represent respectively the inductance of the motor and the internal resistance of the motor of the controlled object, Ln and Rn represent respectively the design value of inductance of the motor and the internal resistance of the motor, s represents the Laplace operator, Keω represents the back electromotive force and K represents a coefficient representing changes in the battery voltage.

Reference number 57 represents a filter for stabilizing the operation of the control system for feeding back the output da(s) of the adder 56, and its characteristic is represented by Q(s). In this embodiment, the primary low-pass filter is used, and the filter characteristic Q(s)=1/(T ls+1) in FIG. 4 shows an example of the filter characteristic Q(s) shown by transfer functions. Here, T1 is a time constant, and s is a Laplace operator. The filter is constituted in such a way that the feeding back of the output of the filter 57 having characteristics Q(s) may result in the containment of variation of the controlled object and that of back electromotive force so that they may agree with the characteristics of the mathematic model defined. We will describe further below on this point.

When the output of the filter 57 is fed back, the detected motor current value Id (s) is shown by the following equation (2).

$$Id(s) = \frac{Pn(s)(1 + \Delta(s))}{1 + Q(s)\Delta(s)} r(s) - \frac{Pn(s)(1 - Q(s))(1 + \Delta(s))}{1 + Q(s)\Delta(s)} \cdot Ke\omega \quad (2)$$

Pn(s) in the equation (2) is a mathematical model of the motor characteristics. And Δ(s) is defined by the following equation (3). Here, Δ(s) represents the perturbation part when the difference between the mathematical model and the actual characteristic is shown by using a multiplication perturbation model $$\Delta(s) = \frac{(Lns + Rn)K}{Ls + R} - 1 \quad (3)$$

When the characteristic Q(s) of the filter is approximately 1, the equation (2) can be shown by the following approximate equation (4) and the detected value Id(s) of the motor current can be obtained thereby.

$$Id(s) \approx Pn(s)r(s) \approx \frac{1}{Lns + Rn} r(s) \quad (4)$$

The output r(s) of the feed forward compensator can be shown by the following equation (5) wherein the current reference value Ir(s) is multiplied by the characteristic (Lns+Rn)/(T2s+1) of the feed forward compensator.
Here, T2 represents a time constant and s represents the Laplace operator.

$$r(s) = \left(\frac{Lns + Rn}{T2s + 1}\right) Ir(s) \quad (5)$$

Therefore, the above approximate equation (4) showing the detected motor current value Id(s) can be shown by the following equation (6) by substituting the equation (5) for r(s) of the approximate equation (4). The approximate equation (6) showing the detected motor current value Id(s) is valid until the cut-off frequency 1/(2π·T1) of the filter having a characteristic Q(s).

$$Id(s) \approx \left(\frac{Lns + Rn}{T2s + 1}\right)\left(\frac{1}{Lns + Rn}\right) Ir(s) = \frac{1}{T2s + 1} Ir(s) \quad (6)$$

On the other hand, there is the minimum gain theorem shown in the following equation (7) as a sufficient condition for the stability of the controlled object to multiplicative perturbation.

$$|T(s) \cdot \Delta(s)| < 1 \quad (7)$$

Here, T(s) is a complementary sensitivity function when the motor, that is the controlled object and its mathematical model agrees, in other words transfer characteristic when Ln=L, Rn=R, and K=1 in FIG. 4. In this embodiment, as T(s)=Q(s), the time constant of the filter 57 having a characteristic Q(s) should be set in such a way that the following equation (8) may be satisfied.

$$|Q(s) \cdot \Delta(s)| < 1 \quad (8)$$

In this embodiment, a robust stability can be secured if the range of Δ(s) defined by the above-mentioned equation (3) is set by taking into account the expected range of variation in the inductance L, the internal resistance R and constant K of the motor, and the time constant T1 of the filter 57 having a characteristic Q(s) is set in such a way that the above-mentioned equation (8) may be satisfied in the whole range of Δ(s).

Figure 5:
FIG. 5 is a block diagram showing the equivalent circuit of the control system by transfer functions.
Figure 5:
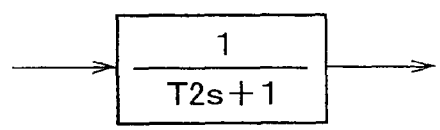

According to the above consideration, the control system shown in FIG. 4 can also be shown by the equivalent block diagram shown in FIG. 5 (a) if the control system is below the cut-off frequency (1/(2π·T1)) of the characteristic Q(s) of the filter 57, and can also be shown in a simplified form as shown in the equivalent block diagram shown in FIG. 5 (b). In other words, the response characteristic defined by the time constant T2 can be realized by providing the inverse characteristic of the mathematical model as the numerator of the characteristic equation of the feed forward compensator 51 shown in FIG. 4 and a time constant T2 larger than the time constant T1 of the above-mentioned filter as the denominator.

And the constitution of the control system as described above enables to compensate variations due to the back electromotive force generated by the rotation of the motor.

Response speed can be set within an arbitrary limit defined by a time constant T2 larger than the time constant T1 of the filter of the characteristic Q(s), and a practically sufficient response characteristic can be realized thereby.

As described above, the detected motor current value Id(s) can be shown by the equation (6), and therefore the motor current estimate value Ied(s) can be shown by the following equation (9).

$$Ied(s) = \frac{1}{T2s + 1} Ir(s) \quad (9)$$

T2: time constant.
s: Laplace operator.
Ir: Motor current reference value.

Such a motor current estimate value can be computed from the motor current reference value. Incidentally, in the following description, motor current reference value will be represented by [Ir], the motor current estimate value will be represented by [Ie], and the detected motor current value will be represented by [id].

It will be now described an embodiment of the abnormality monitor 30. This description will be, however, preceded by a description on the principle of detecting any failure of the current detector by the abnormality monitor 30.

When the current detector is operating normally, the motor current estimate value [Ie] and the detected motor current value [id] show similar changes, and their deviation is small. On the other hand, when the motor current detector has failure, the current control value E grows larger in an effort to harmonize the current reference value and the detected current value. As a result, the motor current grows larger than what is necessary resulting in the torsion in the reverse direction of the torque sensor and the reversion of the direction of the current reference value. The repetition of this state causes the current reference value [Ir] to be oscillating and the motor current estimate value [Ie] computed based on the current reference value [Ir] to be also oscillating.

At this time, change ratio of the motor current estimate value [Ie] grows larger than the change ratio of the detected motor current value id, and the motor current estimate value [Ie] becomes an oscillating current with a short cycle and a large amplitude, while the detected motor current value [id] becomes an oscillating current with a relatively small amplitude.

If the number of motor current detector is limited to one, it is not possible to determine failure by comparing with the detected signal outputted by other motor current detectors. Therefore, in the present invention, the phenomenon that the change ratio of the motor current estimate value [Ie] grows larger than the change ratio of the detected motor current value [id] resulting from a failure of the motor current detector described above is used to detect the failure of the current detector.

In other words, whether the motor current detector 42 is abnormal or not is determined by the number of times when the value of difference (Ie−id) between the motor current estimate value [Ie] (or its derivative value) based on the input signal of a current reference value [Ir] based on the steering torque T sampled at a fixed time interval and the detected motor current value [id] (or its derivative value) detected by the motor current detector exceeded the predetermined threshold value within the predetermined period. There is a plurality of examples for the constitution of the abnormality monitor 30.

FIRST EXAMPLE

The first example of the abnormality monitor 30 uses the motor current estimate value [Ie] estimated based on the current reference value [Ir] and the detected motor current value [id] that has been detected as they are.

The motor current estimator 31 computes the motor current estimate value [Ie] based on the current reference value [Ir] computed based on the steering torque sampled at the predetermined cycle t, and the motor current detector 42 acquires the detected motor current value [id] by sampling the motor current at the predetermined cycle t.

The abnormality determining unit 32 computes the absolute value of difference $\Delta j(=|Ie-id|)$ between the motor current estimate [Ie] and the detected motor current value [id]. It further computes the number of times n when the absolute value of the difference $\Delta j$ exceeded the predetermined threshold value S within the predetermined period T, and it further computes the cumulative value N within the second predetermined period U. And when the cumulative value N exceeded the predetermined reference number of times Z for determining abnormality, it determines that the motor detector 42 is abnormal.

Data Sample for the First Example

Sampling cycle t: 1 ms.
Period T for measuring the number of times n when the absolute value of difference $\Delta j$ (=|Ie-id|) exceeded the threshold value S, period T: 20 ms.
Threshold value S: 10 A (ampere).
Second predetermined period U for acquiring the cumulative value N of number of times n: 200 ms.
Reference number of times for determining abnormality Z: 10 times.

According to the first example, the number of times n when the absolute value of difference $\Delta j(=|Ie-id|)$ exceeded the predetermined threshold value S (=10 A) within the predetermined period T for measuring number of times (T=20 ms) is computed and in addition the cumulative value N of the number of times n within the second predetermined period U (U=200 ms) is computed. In other words, the period for computing the number of times n when the absolute value of difference $\Delta j$ exceeded the threshold value S is reduced, and abnormality is determined based on the cumulative value N of the number of times n. Abnormality is determined based on the number of times when the threshold value S was exceeded during the period U which is relatively long period. If a long period U is set from the beginning for measuring the number of times of exceeding the threshold S, however, a long period is required until the determination of abnormality because the period U has to pass. If the number of times n and its cumulative value N are measured, on the other hand, any abnormality can be determined in the minimum delay in time.

SECOND EXAMPLE

The second example of the abnormality monitor 30 uses the motor current estimate value [Ie] estimated by computing from the current reference value [Ir] and the detected motor current value [id] that has been detected as they are. However, the method of processing and determining is different from that of the first example.

The motor current estimator 31 computes the motor current estimate value [Ie] based on the current reference value [Ir] computed based on the steering torque value sampled at the predetermined cycle t, and the motor current detector 42 acquires the detected motor current value [id] by sampling the motor current at the predetermined cycle t.

The abnormality determining unit 32 measures the number of times n1 when the motor current estimate value [Ie] exceeded the predetermined threshold value S1 within the predetermined period T1, and the number of times n2 when the detected motor current value [id] exceeded the predetermined threshold value S2 within the predetermined period T2. It computes the absolute value of difference $\Delta j(=|n1-n2|)$ between the numbers of times n1 and n2, and when the absolute value of difference $\Delta j$ exceeded the reference number of times Z for determining abnormality, it determines that the motor current detector 42 is abnormal.

Data Sample for the Second Example sampling cycle t: 1 ms.
Period T1 for measuring the number of times n1 when the motor current estimate value [Ie] exceeded the threshold value S1, Period T1: 1,000 ms.
Threshold value S1: 10 A (ampere).
Period T2 for measuring the number of times n2 when the detected motor current value [id] exceeded the threshold value S2, Period T2: 1,000 ms.
Threshold value S2: 10 A (ampere).
Reference number of times for determining abnormality Z: 200 times.

According to the second example, the number of times n1 when the motor current estimate value [Ie] exceeded the threshold value S1 within the period T1 (T1=1,000 ms) and the number of times n2 when the detected motor current value [id] exceeded the threshold value S2 within the period T2 (T2=1,000 ms) are computed, and when the absolute value of difference $\Delta j(=|n1-n2|)$ exceeded the reference number of times Z for determining abnormality, it determines that there is an abnormality. Thus, a reliable determination of abnormality can be achieved by taking a relatively longer period of time.

THIRD EXAMPLE

The third example of the abnormality monitor 30 uses the derivative value of the motor current estimate value [Ie] and the derivative value of the detected motor current value [id].

The motor current estimator 31 computes the motor current estimate value [Ie] based on the current reference value [Ir] computed based on the steering torque value sampled at the predetermined cycle t, and computes its derivative value [dIe], while the motor current detector 42 acquires the detected motor current value [id] by sampling the motor current at the predetermined cycle t and computes its derivative value [did].

The abnormality determining unit 32 measures the number of times n1 when above-mentioned derivative value [dIe] of the motor current estimate value [Ie] exceeded the predetermined threshold value S1 within the predetermined period T1, and the number of times n2 when the derivative value [did] of the detected motor current value [id] exceeded the predetermined threshold value S2 within the predetermined period T2. It computes the absolute value of difference $\Delta j(=|n1-n2|)$ between the numbers of times n1 and n2, and when the absolute value of difference $\Delta j$ exceeded the predetermined reference number of times Z for determining abnormality, it determines that the motor current detector 42 is abnormal.

Data Sample for the Third Example

Sampling cycle t: 1 ms.
Period T1 for measuring the number of times n1 when derivative value [dIe] of the motor current estimate exceeded the threshold value S1, Period T1: 200 ms.
Threshold value S1: 10 A (ampere).
Period T2 for measuring the number of times n2 when the derivative value [did] of the detected motor current value exceeded the threshold value S2, Period T2: 200 ms.
Threshold value S2: 10 A (ampere)
Reference number of times for determining abnormality Z: 10 times

FOURTH EXAMPLE

The fourth example of the abnormality monitor 30 also uses the derivative value of the motor current estimate [Ie] and the derivative value of the detected motor current value [id]. However, the method of processing and determining them is different from that of the third example.

The motor current estimator 31 computes the motor current estimate value [Ie] based on the current reference value [Ir] computed based on the steering torque value sampled at the predetermined cycle t, and computes its derivative value [dIe], while the motor current detector 42 acquires the detected motor current value [id] by sampling the motor current at the predetermined cycle t and computes its derivative value [did].

When the derivative value [did] of the detected motor current value is less than the predetermined threshold value S1, the abnormality determining unit 32 measures the number of times n1 by adding 1 to the first counter, and when the derivative value [did] of the detected motor current value is equal to or higher than the predetermined threshold value S1, it resets the measurement of the first counter to zero.

From the moment when measurement of the first counter rises higher than the predetermined value within the predetermined period T1, the abnormality determining unit 32 monitors the derivative value [dIe] of the motor current estimate value, and when the derivative value [dIe] of the motor current estimate value exceeds the predetermined threshold value S2, it measures the number of times t2 by adding 1 to the second counter. At this time, if the measurement of the first counter is less than the predetermined value or when the derivative value [dIe] of the motor current estimate value is less than the predetermined value, the measurement of the second counter is not renewed.

When the measurement of the second counter exceeded the reference number of times z within the predetermined period T2, the abnormality determining unit determines that the motor current detector 42 is abnormal.

The first counter is a counter for confirming that the detected motor current value does not change, and the second counter is a counter for confirming that the motor current estimate value changes largely when the detected motor current value confirmed by the first counter shows only a change smaller than the predetermined value within the limit of the predetermined period.

Data Sample for the Fourth Example

Period T1 for measuring by the first counter the number of times n1 when derivative value [did] of the detected motor current value is less than the threshold value S1, Period T1: 200 ms.
Threshold value S1: 10 A (ampere).
Sampling cycle t: 1 ms.
Period T2 for measuring by the second counter the number of times n2 when the derivative value [dIe] of the motor current estimate exceeded the threshold value S2, Period T2: 200 ms.
Threshold value S2: 10 A (ampere).
Reference number of times for determining abnormality Z: 10 times

FIFTH EXAMPLE

The fifth example of the abnormality monitor 30 uses the derivative value of the motor current estimate [Ie] and the derivative value of the detected motor current value [id]. However, the method of processing and determining is different from that of the fourth example.

The motor current estimator 31 computes the motor current estimate value [Ie] based on the current reference value [Ir] computed based on the steering torque value sampled at the predetermined cycle t, and computes its derivative value [dIe]. On the other hand, the motor current detector 42 acquires the detected motor current value [id] by sampling the motor current at the predetermined cycle t and computes its derivative value [did].

When the derivative value [dIe] of the motor current estimate value is less than the predetermined threshold value S1, the abnormality determining unit 32 measures the number of times n1 by adding 1 to the first counter, and when the derivative value [dIe] of the motor current estimate value is equal to or more than the predetermined threshold value S1, it resets the measurement of the first counter to zero.

From the moment when the measurement of the first counter rises to or higher than the predetermined value within the predetermined period T1, the abnormality determining unit 32 monitors the derivative value [did] of the detected motor current value, and when the derivative value [did] of the detected motor current value exceeds the predetermined threshold value S2, it measures the number of times n2 by adding 1 to the second counter. At this time, if the measurement of the first counter is less than the predetermined value or when the derivative value [did] of the motor current estimate value is less than the predetermined value, the measurement of the second counter is not renewed.

When the measurement of the second counter exceeded the reference number of times z within the predetermined period T2, the abnormality determining unit 32 determines that the motor current detector 42 is abnormal.

The first counter is a counter for confirming that the motor current estimate value does not change, and the second counter is a counter for confirming that the detected motor current value changes largely when the motor current estimate value confirmed by the first counter shows only a change smaller than the predetermined value within the limit of the predetermined period.

Data Sample for the Fifth Example

Period T1 for measuring by the first counter the number of times n1 when derivative value [dIe] of the motor current estimate value is less than the threshold value S1, Period T1: 100 ms.
Threshold value S1: 10 A (ampere).
Sampling cycle t: 1 ms.
Period T2 for measuring by the second counter the number of times n2 when the derivative value of the detected motor current value [did] exceeded the threshold value S2, Period T2: 100 ms.

Threshold value S2: 40 A (ampere).

Reference number of times for determining abnormality Z: 10 times.

The third, fourth and fifth examples use the derivative value of the motor current estimate value and the derivative value of the detected motor current value, and the use of derivative values assures that any change in the state will be grasped rapidly with certainty.

According to the embodiment of the present invention described above, upon determining an abnormality of the motor current detector 42, the abnormality detecting unit 30 outputs an abnormality detection signal to the motor drive circuit 41. In response to this abnormality detection signal, the motor drive circuit 41 cuts off the motor driving signal or the motor power. This results in the stop of steering assistance by the motor and a switch over to manual steering contributing to the prevention of any unexpected accidents.

INDUSTRIAL APPLICABILITY

The present invention is designed to determine any failure of the motor current detector based on the number of times when the difference between the motor current estimated value estimated based on the current reference value and the detected motor current value exceeded the predetermined threshold value set in advance, to be able to correctly detect any failure in the motor current detector and to provide a highly safe electric power steering device.

What is claimed is:

1. An electric power steering device comprising:
    a controlling device for controlling a motor output providing a steering system with a steering assist force based on a steering torque generated at least on a steering shaft, said controlling device including:
        a current reference value computing unit for computing a current reference value or a control target value of the motor output based on the steering torque detected in each predetermined sampling cycle,
        a motor current estimator for computing a motor current estimate value based on the current reference value,
        a motor current detector for detecting a motor current, and
        an abnormality monitor for monitoring any abnormality of the motor current detector and for outputting a signal for stopping a motor drive when an abnormality is detected, said abnormality monitor measuring the number of times when the difference between said motor current estimate value that has been computed and the detected motor current value that has been detected exceeded a predetermined threshold value within a predetermined period, and determining that the motor current detector is abnormal when the number of excesses exceeded a predetermined reference number of times for determining abnormality; and
    a motor drive circuit configured to receive a plurality of control values based on differences between current reference values and detected motor current values and to drive the motor on the basis of the control values, the motor drive circuit including:
        a conversion circuit adapted to convert control values into a pulse width modulation signal and a current direction signal, the pulse width modulation signal based on magnitudes of control values and the current direction signal based on signs of control values, and
        a control circuit configured to control current flow in the motor on the basis of the pulse width modulation and current direction signals.

2. The electric power steering device of claim 1, wherein the control circuit includes two field effect transistors connected to one terminal of the motor and two field effect transistors connected to a second terminal of the motor.

* * * * *